US007356145B2

(12) United States Patent
Ala-Laurila et al.

(10) Patent No.: US 7,356,145 B2
(45) Date of Patent: Apr. 8, 2008

(54) ARRANGING DATA CIPHERING IN A WIRELESS TELECOMMUNICATION SYSTEM

(75) Inventors: Juha Ala-Laurila, Tampere (FI); Jukka-Pekka Honkanen, Tampere (FI); Jyri Rinnemaa, Tampere (FI)

(73) Assignee: Nokia Corporation, Wilmington, DE (US)

( * ) Notice: Subject to any disclaimer, the term of this patent is extended or adjusted under 35 U.S.C. 154(b) by 552 days.

(21) Appl. No.: 09/896,399

(22) Filed: Jun. 29, 2001

(65) Prior Publication Data

US 2002/0009199 A1    Jan. 24, 2002

(30) Foreign Application Priority Data

Jun. 30, 2000    (FI)    ................... 20001567

(51) Int. Cl.
H04K 1/00    (2006.01)
H04M 1/66    (2006.01)

(52) U.S. Cl. .................. 380/247; 380/249; 380/270; 455/411

(58) Field of Classification Search .......... 380/270, 380/247, 249
See application file for complete search history.

(56) References Cited

U.S. PATENT DOCUMENTS

| 5,070,528 | A | * | 12/1991 | Hawe et al. ................. 713/161 |
| 5,539,824 | A | * | 7/1996 | Bjorklund et al. .......... 380/249 |
| 5,606,548 | A | * | 2/1997 | Vayrynen et al. ........... 370/252 |
| 5,694,417 | A | * | 12/1997 | Andren et al. ............... 375/150 |
| 5,706,428 | A | * | 1/1998 | Boer et al. ................... 370/342 |
| 5,796,832 | A | * | 8/1998 | Kawan ......................... 705/65 |
| 5,978,475 | A | * | 11/1999 | Schneier et al. ............ 713/177 |
| 6,351,536 | B1 | * | 2/2002 | Sasaki .......................... 380/44 |
| 6,373,946 | B1 | * | 4/2002 | Johnston ...................... 380/211 |
| 6,526,506 | B1 | * | 2/2003 | Lewis .......................... 713/153 |
| 6,539,237 | B1 | * | 3/2003 | Sayers et al. ................ 455/555 |
| 6,707,914 | B1 | * | 3/2004 | Bell ............................. 380/46 |

(Continued)

FOREIGN PATENT DOCUMENTS

EP    0405215 A2 *    2/1991

(Continued)

OTHER PUBLICATIONS

John Scourias, Overview of the global system for mobile communications, Oct. 14, 1997, pp. 1-16.*

(Continued)

*Primary Examiner*—Kambiz Zand
*Assistant Examiner*—Eleni A Shiferaw
(74) *Attorney, Agent, or Firm*—Connolly Bove Lodge & Hutz LLP

(57) ABSTRACT

Arranging data ciphering in a telecommunication system comprising at least one wireless terminal, a wireless local area network and a public land mobile network. At least one first ciphering key according to the mobile network is calculated in the mobile network and in the terminal for a terminal identifier using a specific secret key for the identifier. Data transmission between the mobile network and the terminal is carried out through the wireless local area network. A second ciphering key is calculated in the terminal and in the mobile network using said at least one first ciphering key. The second ciphering key is sent from the mobile network to the wireless local area network. The data between the terminal and the network is ciphered using said second ciphering key.

7 Claims, 3 Drawing Sheets

U.S. PATENT DOCUMENTS

2002/0077094 A1 * 6/2002 Leppanen .................... 455/420
2004/0105549 A1 * 6/2004 Suzuki et al. ............... 380/278

FOREIGN PATENT DOCUMENTS

| EP | 0930795 A1 * | 7/1999 |
|---|---|---|
| GB | 2278518 * | 11/1994 |
| WO | WO 99/16266 | 4/1999 |
| WO | WO 00/01187 * | 1/2000 |
| WO | WO 00/76238 A1 * | 12/2000 |
| WO | WO 01/13666 A1 * | 2/2001 |

OTHER PUBLICATIONS

Anand R. Prasad et al., Security Architecture for wireless LANs: Corporate & Public Enviroment, May 2000, pp. 283-287.*
M. Mouly & M-B. Pautet, The GSM System for Mobile Communications, XP-002037920, Chapter 7.2, Security Management, pp. 477-493, ISBN 2-9507 190-0-7.

* cited by examiner

ARRANGING DATA CIPHERING IN A WIRELESS TELECOMMUNICATION SYSTEM

BACKGROUND OF THE INVENTION

The invention relates to arranging data ciphering in wireless telecommunication systems and particularly in Wireless Local Area Networks WLAN.

Recently various wireless local area networks have become common in addition to Public Land Mobile Networks PLMN. Such wireless local area networks include for example networks based on EEE802.11 standard. Particular attention has been paid to the safety of IEEE802.11 networks by producing a Wired Equivalent Privacy WEP function. The WEP describes traffic ciphering on layer 2 (MAC) between a terminal and an access point supporting IEEE802.11 standard. The WEP is a symmetrical algorithm, in which the same ciphering key is used for enciphering and deciphering data.

However, a problem in some wireless telecommunication networks, such as IEEE802.11 WLAN networks, is that the ciphering keys used for ciphering traffic must be stored in advance in the terminal and access point. If the network does not have the same key as the terminal, then the data between the network and the terminal cannot be ciphered. To add different ciphering keys is difficult, and a safe data transmission cannot always be offered for terminals moving in different networks.

BRIEF DESCRIPTION OF THE INVENTION

It is an object of the invention to provide a new method for creating the keys to be used in ciphering for a wireless local area network and for employing them so as to avoid the above problems. The objects of the invention are achieved with a method, a system, a terminal and an access point, characterized in what is disclosed in the independent claims. The preferred embodiments of the invention are disclosed in the dependent claims.

The invention is based on the idea that a so-called second ciphering key is calculated in the terminal and in the public land mobile network on the basis of at least one so-called first ciphering key according to the public land mobile network. The second ciphering key is sent from the mobile network to the wireless local area network. The data between the terminal and the network is enciphered and deciphered in the terminal and in the wireless local area network using the second ciphering key.

This provides the advantage that in the wireless local area network the mobile network and the identity module offered thereby can be utilized for calculating the ciphering key to be used. The wireless local area network can dynamically be offered a ciphering key for mobile terminals when the terminal is establishing a connection. In such a case the ciphering key need not be stored in the wireless local area network in advance.

According to a preferred embodiment of the invention at least one authentication response according to the mobile network is calculated in the terminal and in the mobile network on the basis of at least one challenge code and a ciphering key. A check response is calculated in the terminal on the basis of at least one authentication response and the first ciphering key. The check response is sent to the mobile network. The check response is calculated in the mobile network on the basis of at least one authentication response and at least one first ciphering key. The check response sent by the terminal is compared with the check response calculated by the mobile network. The second ciphering key is sent from the mobile network to the wireless local area network, if the check response sent by the terminal and calculated by the mobile network correspond with one another. This embodiment provides the advantage that a subscriber (identity module) can be reliably authenticated in the mobile network. Consequently a data transmission connection and data ciphering can be allowed only for the authenticated terminals in the wireless local area networks.

In accordance with another preferred embodiment of the invention, a protection code is sent from the terminal to the mobile network. The mobile network calculates a check sum using the protection code and at least one first ciphering key. The check sum is sent to the terminal to be checked. The second ciphering key is calculated in the terminal if the received check sum is correct. This has the advantage that the reliability of the mobile network is ensured in the terminal, meaning that the terminal knows whether the mobile network possesses the secret key associated with the identity module.

BRIEF DESCRIPTION OF THE DRAWINGS

In the following the invention will be described in greater detail in connection with the preferred embodiments with reference to the accompanying drawings, in which.

DETAILED DESCRIPTION OF THE INVENTION

Figure 1:
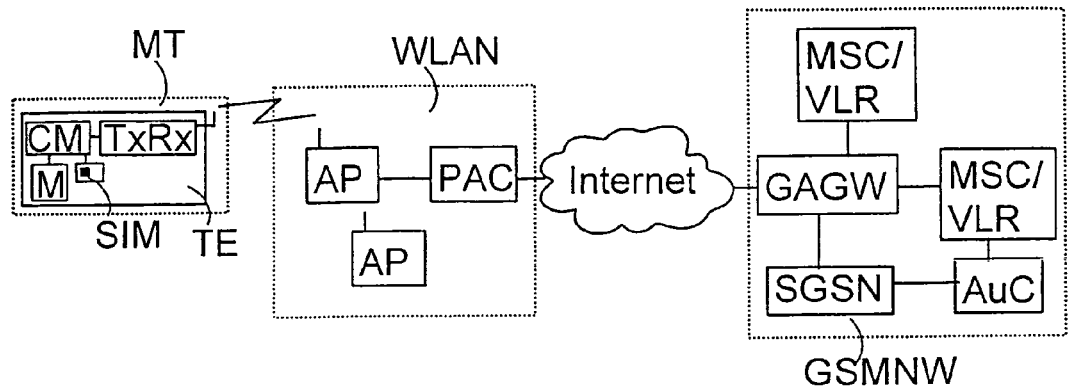
FIG. 1 is a block diagram showing a wireless telecommunication system according to a preferred embodiment.

The invention can be applied in any wireless telecommunication system comprising a wireless local area network and a public land mobile network. FIG. 1 shows a telecommunication system according to a preferred embodiment of the invention. The system comprises a mobile terminal MT, a WLAN network WLAN according to IEEE802.11 standard and a public land mobile network, in this embodiment a GSM network GSMNW. The invention can, however, also be applied in other networks: the wireless local area network may, for example, be a network according to BRAN standards (Broadband Radio Access Network). BRAN standards comprise HIPERLAN standards (High Performance Radio Local Area Network) of type 1 and 2, HIPER ACCESS and HIPERLINK standards. The mobile network is not either limited to the GSM network but the invention can also be applied for instance in a UMTS network (Universal Mobile Telecommunications System).

A WLAN network operator, WISP (Wireless Internet Service Provider) offers wireless IP-based services in accordance with a preferred embodiment so that the terminals MT are able to move in different typically highly loaded hot spots, such as hotels, airports etc. The WLAN network WLAN comprises WLAN access points AP offering a wireless connection for several terminals MT. IEEE802.11 standard determines the physical layer and MAC layer protocols for data transmission over the radio interface. Infrared or two spread spectrum techniques (Direct Sequence Spread Spectrum DSSS, Frequency Hopping Spread Spectrum FHSS) can be used in data transmission. Both spread spectrum techniques employ e.g. 2.4 gigahertz frequency bands. In accordance with IEEE802.11 standard a so-called CSMA/CA technique (Carrier Sense Multiple Access with Collision Avoidance) is used on the MAC layer.

A Subscriber Identity Module SIM, which is specific for the GSM network, is connected to the terminal equipment TE of the terminal MT, meaning that the terminal MT comprises both the TE and the SIM. Different identity modules can be used in the terminal MT depending on the mobile network; the UMTS network, for example, employs an identity module USIM (UMTS Subscriber Identity Module). The SIM is typically stored on an IC card (Integrated Circuit), which can be changed from one equipment TE to another. The SIM is provided by the mobile network GSMNW operator, and data concerning the SIM is stored in the mobile network GSMNW. The SIM comprises an International Mobile Subscriber Identity IMSI which represents the subscriber in the network, thus operating as an identifier of the terminal MT. The terminal equipment TE of the terminal MT may also include a specific International Mobile Equipment Identity IMEI, which is not really relevant for the invention. The SIM also comprises a secret key Ki, an algorithm A8 for forming a ciphering key Kc and an algorithm A3 for forming an authentication response SRES (Signed Response).

The MT comprises control means CM for controlling the operation of the MT and the communication between the MT and the wireless local area network WLAN by utilizing the memory M. The control means CM calculate, among other things, the second ciphering key in the MT as will be described below. By means of card reading means (not shown) included in the MT, the CM may utilize the subscriber identity module SIM and the data therein. The MT also comprises a transceiver TxRx for communicating with at least the access point AP of the network WLAN. The MT may be, for example, a portable computer with a WLAN adapter card comprising an IC card, a smart card or the like. The terminal MT may also comprise a GSM mobile station part for communicating with the GSM network.

The WLAN terminals MT may form a so-called ad hoc network simply by establishing a connection with another mobile terminal. What are known as infrastructure networks are formed by establishing connections between the access points AP and the terminals MT. The access points AP offer network connections to the terminals MT, thus forming a so-called Extended Service Set ESS. The access points AP control at least the allocation of transmission times, data reception, buffering and the transmission between the terminal MT and the network WLAN. The access points AP may form subnetworks. A logical WLAN network WLAN may, in turn, comprise one or more sub-networks.

The WLAN network WLAN may also offer a connection through a gateway to other networks, such as the Internet. The connection to other networks can be arranged from the network WLAN through a Public Access Controller PAC. The PAC is an entity of the network WLAN that controls the access to the Internet services, for example. In accordance with a preferred embodiment it allocates an IP address to the terminal MT and allows a connection to be established to the Internet only if the terminal MT can be authenticated. Typically the WLAN network NW also comprises other servers, such as a Dynamic Host Configuration Protocol DHCP server which allocates IP addresses in the network WLAN.

The mobile network GSMNW comprises one or more Mobile Switching Centers MSCNLR typically comprising a Visitor Location Register VLR and/or GPRS operating nodes SGSN (Serving (General Packet Radio Service) Support Nodes). The mobile network GSMNW also comprises a GSM/GPRS Authentication and Billing Gateway GAGW, which is connected to the Internet. The GAGW is an entity in the mobile network GSMNW offering authentication services of mobile subscribers to the WLAN networks WLAN and preferably also collects billing information. Hence, the subscriber data and the authentication services of the mobile network GSMNW can be used for serving the terminals MT comprising the identity module SIM in the WLAN network WLAN. The terminal MT user does not need to have a pre-agreed agreement with the operator of the WLAN network WLAN. A visiting terminal MT may use the identity module SIM and the mobile network GSMNW for implementing authentication and billing when visiting the network WLAN. In such a case the wireless connection offered by the network WLAN can be billed through the GAGW of the mobile network GSMNW. The WLAN operator may later compensate the mobile operator for the use of the network.

As is known from the GSM system, the home network of the subscriber with the identity module SIM comprises subscriber data which is stored in the GSM Home Location Register HLR. The entity PAC in the WLAN network WLAN sends authentication and billing data to the gateway GAGW. The GAGW may use known GSM signalling for requesting authentication data for the identity module SIM, and perform the authentication and the calculation of the cipering key as will be described below. If the SIM can be authenticated, the PAC may offer a connection to the Internet or to other parts of the network WLAN. The PAC may also use other methods than the SIM-based authentication for identifying the terminal MT, such as the identification of the password.

The PAC may transmit user data between the Internet and the terminal MT. The interfaces between the terminal MT and the controller PAC and between the PAC and the GAGW are IP-based in accordance with a preferred embodiment of the invention. It should be noted that also other techniques than the IP can be used. In contrast to FIG. 1, the Internet is not necessarily needed between the PAC and the GAGW, even if the IP protocol is used. From now on it is assumed that the IP is used, in which case the MT, the PAC and the GAGW are identified using the IP addresses thereof. The interface between the gateway GAGW and the mobile network GSMNW depends on the implementation, for example, when the mobile network is a UMTS network, said interface may be different in comparison with the GSM network. The gateway GAGW covers the infrastructure of the mobile network GSMNW from the PAC. Therefore, the interface between the PAC and the GAGW remains the same irrespective of the mobile network GSMNW.

Figure 2:
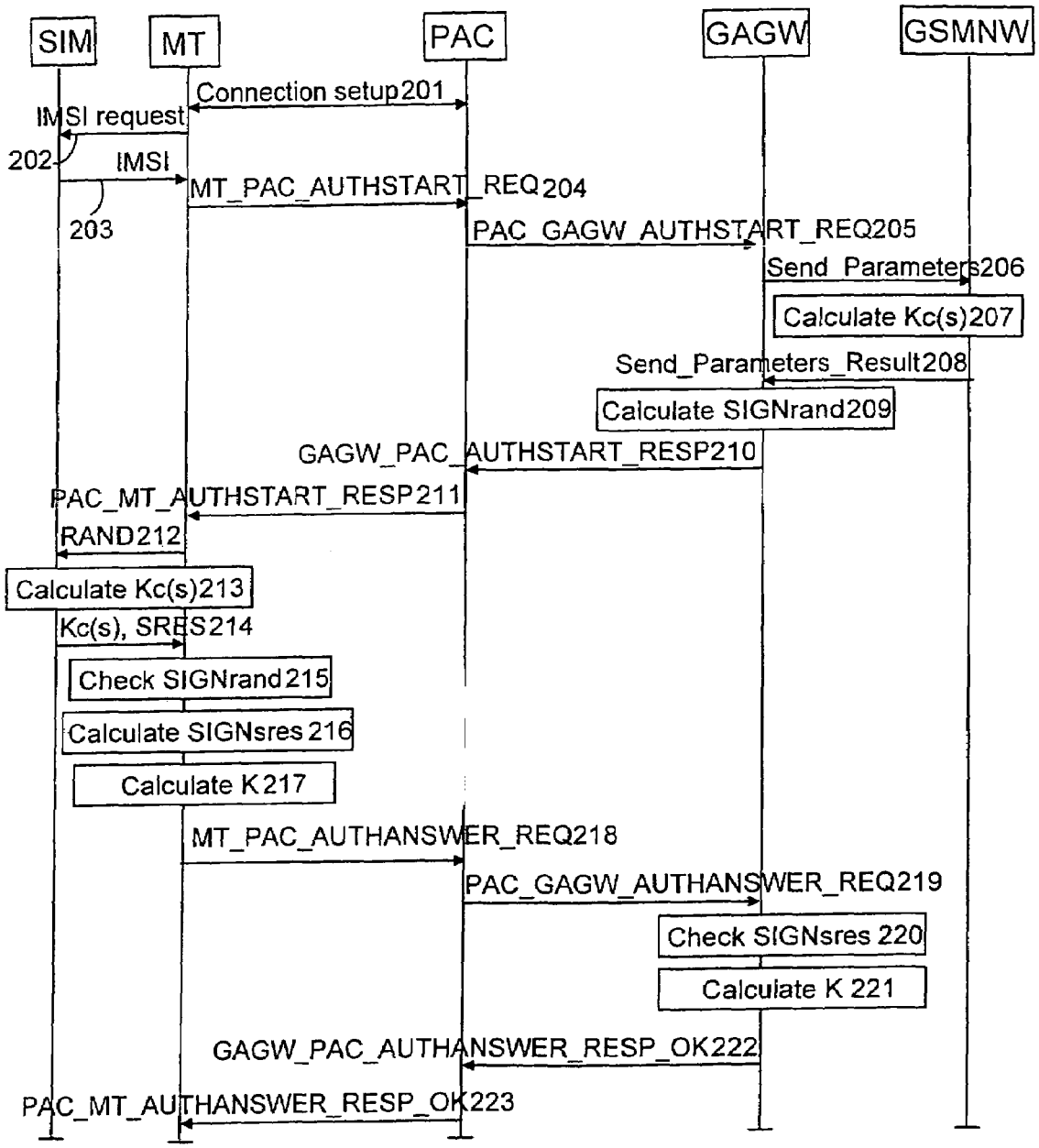
FIG. 2 is a signalling diagram showing the authentication and the calculation of a ciphering key according to a preferred embodiment.

FIG. 2 shows the essential functions according to a preferred embodiment of the invention for authenticating the terminal MT and for calculating a ciphering key. The terminal MT is offered an identifier IMSI and a secret key Ki by the subscriber identity application SIM included therein. The authentication process of the terminal MT is typically triggered when the MT starts setting up a connection 201 (Connection setup) with the WLAN network WLAN. Then the MT is provided with an IP address through a DHCP server (Dynamic Host Configuration Protocol). Before the terminal MT is allowed to establish a connection with other networks than the network WLAN, the authentication must be performed in an acceptable manner.

The MT requests 202 (IMSI request) the identity module SIM for the IMSI identifier and the SIM returns 203 the IMSI identifier. The MT sends 204 the authentication starting request (MT_PAC_AUTHSTART_REQ) which preferably comprises a Network Access Identifier NAI. The NAI comprises the IMSI identifier obtained from the identity module SIM. The NAI may be presented, for example, in the form 12345 GSM.org, where 12345 is the IMSI identifier and GSM.org is the domain name of the mobile network, which has conveyed the identity module SIM. The request 204 is preferably sent in ciphered form to the PAC using the Diffie-Hellman algorithm, for example. The MT preferably also sends a specific protection code MT_RAND in the request 204, said code typically being a challenge code. Using the protection code MT_RAND the MT may later be ensured that the party conveying the GSM triplets actually has access to the secret key Ki, which is to be maintained in the GSM home network of the subscriber. However, the use of the protection code is not obligatory.

The PAC deciphers the request 204 if needed and sends 205 the GAGW a request (PAC_GAGW_AUTHSTART_REQ) based on the domain part of the network identifier NAI for authenticating the identity module SIM according to the IMSI identifier. This message comprises the network identifier NAI and the protection code MT_RAND sent by the terminal MT.

The GAGW requests 206 (Send_Parameters) at least one triplet from the mobile network GSMNW. This can be arranged so that the GAGW transmits the request to the nearest mobile services switching center MSCNLR (or to the operation node SGSN). The MSCNLR checks the IMSI identifier and sends a request to the home location register HLR of the network possessing the identity module SIM, the HLR typically comprising an Authentication Center AuC (the GSMNW AuC in the Figure). In the first calculation means included in the mobile network GSMNW, i.e. when the GSM network is concerned, the authentication center AuC forms 207 (Calculate Kc(s)) one or more GSM triplets (RAND, SRES, Kc) in a known manner using the secret key Ki according to the IMSI identifier. A GSM triplet comprises a challenge code, i.e. a random number, RAND, an authentication response SRES formed on the basis of the RAND and a secret key Ki using an algorithm A3, and a first ciphering key Kc formed on the basis of the RAND and the secret key Ki using an algorithm A8. The HLR sends the triplet to the MSC/IVLR which forwards the triplet to the GAGW 208 (Send_Parameters_Result). The mobile network GSMNW can also send several triplets, whereby the GAGW preferably selects one and stores the other triplets for later use.

The GAGW preferably also calculates 209 (Calculate SIGNrand) a check sum or a message authentication code SIGNrand using the protection code MT_RAND sent by the terminal MT and the Kc. The SIGNrand is a cryptographic check sum which allows to ensure that the data sent actually originates from the entity having a connection with the secret key Ki in the mobile network GSMNW.

The GAGW sends 210 the PAC an acknowledgment message of the authentication request GAGW_PAC_AUTHSTART_RESP comprising one or more challenge codes RAND for the terminal MT and preferably also a check sum SIGNrand. This message may also include data associated with billing. The message can also be ciphered using the protection code MTRAND. The PAC sends 211 the terminal MT an acknowledgment message of the authentication request PAC_MT_AUTHSTART_RESP comprising at least one challenge code RAND and preferably the check sum SIGNrand.

The terminal MT feeds 212 the challenge code/s RAND into the identity module SIM. The SIM calculates 213 (Calculate Kc(s)) at least one first ciphering key Kc according to the mobile network GSMNW and an authentication response (responses) SRES in a manner that corresponds with the one used in the authentication center AuC and transmits 214 these to the other parts of the terminal MT (preferably to the control means CM carrying out authentication and the calculation of the second ciphering key K). The MT can check 215 (Check SIGNrand) the check sum SIGNrand sent by the PAC on the basis of the data (Kc) obtained from the SIM and the protection code MT_RAND. If the received SIGNrand corresponds with the value obtained on the basis of the Kc values calculated by the identity module SIM, the MT, or to be more precise, the CM calculates 216 (Calculate SIGNsres) the check response SIGNsres to be transmitted to the GAGW. The SIGNsres is preferably a hash function calculated from one or more first ciphering keys Kc and authentication responses SRES enabling the GAGW to authenticate the MT. The MT may also request the user to approve the billing data possibly sent by the PAC.

The second calculation means included in the MT, preferably the control means CM, calculate 217 (Calculate K) a second ciphering key K using one or more first ciphering keys Kc according to the mobile network GSMNW calculated by the SIM. The K is calculated in accordance with a preferred embodiment as follows:

$$K=HMAC\ (n^*Kc,\ n^*RAND|IMSI|MT\_RAND),$$
where

HMAC is a mechanism for the authentication using the hash function, $n^*Kc$ is n Kcs, $n^*RAND$ is n RANDs, IMSI is the subscriber identity from SIM and MT_RAND is the challenge code generated by the MT.

The second ciphering key K calculated in this way is more difficult to define than the first ciphering key Kc, and the ciphering obtained is stronger than the GSM ciphering. The MT stores the K in the memory M thereof or in the smart card memory for later use. For example, MD5 and SHA-1 algorithms can be used for calculating the K.

The MT sends 218 the PAC an authentication response message (MT_PAC_AUTHANSWER_REQ). The message comprises at least the check response SIGNsres and the protection code MT_RAND of the MT (as preferably all the messages associated with authentication). The PAC sends 219 the GAGW an authentication response message (PAC_GAGW_AUTHANSWER_REQ) comprising the network identifier NAI and the address information of the PAC in addition to the data in the message (218) sent by the terminal MT. The GAGW checks 220 (Check SIGNsres) the check response SIGNsres sent by the terminal MT. It is also possible that the GAGW generates the check response SIGNsres when calculating (209) the check sum SIGNrand. If the SIGNsres calculated by the GAGW corresponds with the SIGNsres value sent by the terminal MT, the check is successful and the terminal is acceptably authenticated.

If the authentication is acceptable, the second calculation means in the mobile network, or the GAGW, calculate 221 (Calculate K) the second ciphering key K using at least one first ciphering key Kc according to the mobile network GSMNW. The K is calculated in the same way and using the same parameters as the terminal MT uses for carrying out the calculation (217):

$$K=HMAC\ (n^*Kc,\ n^*RAND/IMSI/MT\_RAND).$$

Figure 3:
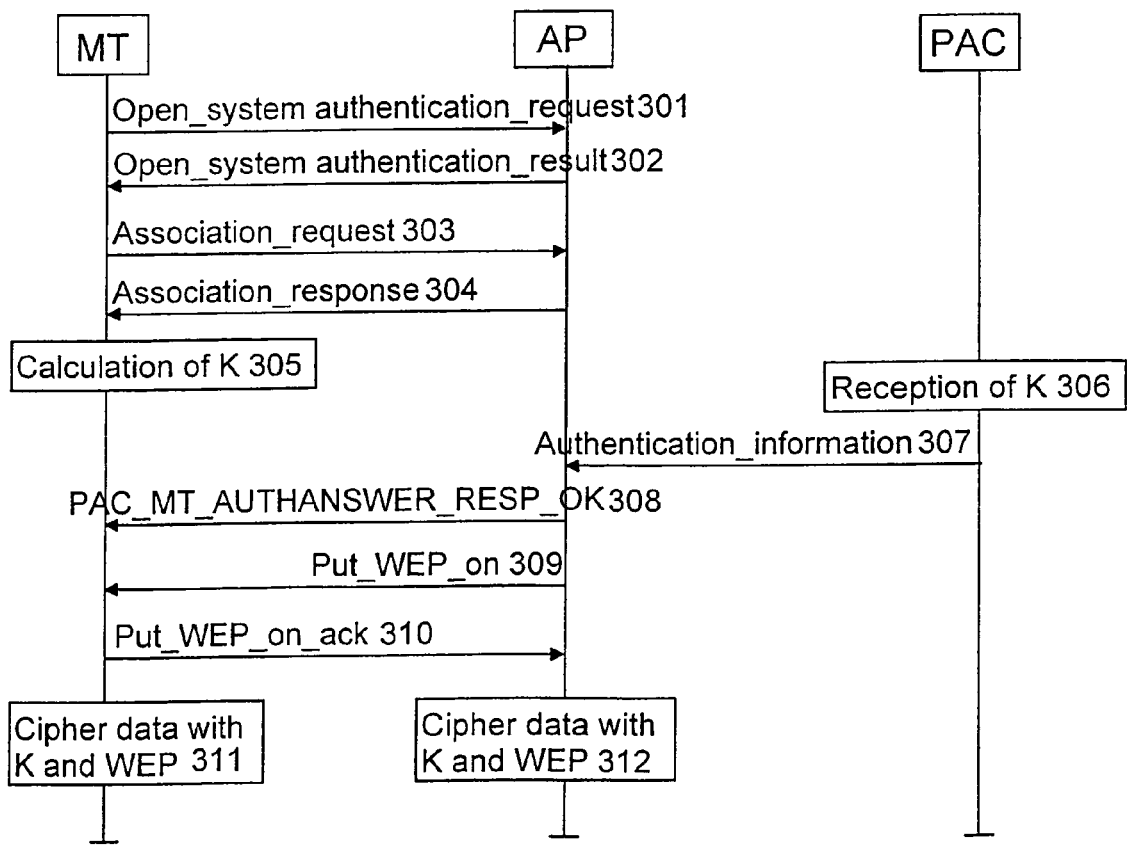
FIG. 3 illustrates the arrangement of ciphering between a terminal and an access point according to a preferred embodiment.

It is also possible deviating from FIG. 3 that the GAGW calculates and stores in its memory the second ciphering key K when obtaining the triplet from the network GSMNW (208) and sends the K stored in the memory to the WLAN network WLAN if the authentication is acceptable.

The GAGW informs 222 the PAC about the authentication being accepted (GAGW_PAC_AUTHANSWER_RESP_OK). This message comprises at least the second ciphering key K. Information on services that the MT is authorized to use (such as quality of service QoS data) can also be sent in the message 222. The PAC informs 223 the terminal MT about the authentication being accepted (PAC_MT_AUTHANSWER_RESP_OK). Authentication is then performed and both the terminal MT and the PAC comprise a similar second ciphering key K which can be transmitted to the ciphering means performing ciphering for ciphering traffic.

If the authentication is not successful, the message 222 (and 223) comprise the data on authentication failure and the terminal MT is preferably not offered any services in the network WLAN.

The data transmission between the terminal MT and the access controller PAC may utilize messages based on an IKE (Internet Key Exchange) protocol. Messages based on a RADIUS (Remote Authentication Dial In User Service) protocol can, in turn, be used between the PAC and the GAGW.

FIG. 3 illustrates a ciphering arrangement between the terminal MT and the access point AP according to a preferred embodiment of the invention. When the MT finds an accessible access point AP, it preferably sends a request 301 (Open system_authentication_request) for open system authentication in accordance with IEEE802.11 standard to the access point AP. In practice the open system authentication does not carry out an actual authentication, whereby any IEEE802.11 standard MT can be authenticated. The MT only informs about its identity in the request 301. The AP sends 302 (Open_system_authentication_result) a response to the MT.

If the AP accepts the MT to its network, the MT requests 303 (Association_request) for association to the network WLAN. The AP responds 304 (Association response) to the request. Association is carried out so that the WLAN network WLAN knows to which AP the data directed to the MT should be sent. The terminal MT must be associated to one access point AP at a time, in order to send data through the AP.

After this, authentication and the calculation of the second ciphering key K are preferably carried out as illustrated in FIG. 2 using the mobile network GSMNW. In this case the terminal MT calculates 305 (Calculation of K) the second ciphering key K. If the authentication is acceptable, the PAC receives 306 (Reception of K) the second ciphering key K calculated by the GAGW. The PAC sends 307 (Authentication_information) the AP the second ciphering key K and informs about a successful authentication, in which case the AP links the K to the MAC address of the terminal MT. The PAC preferably informs 308 the MT about the successful authentication (PAC_MT_AUTHANSWER_RESP_OK) through the AP utilizing the same message.

After receiving the second ciphering key K, the AP sends 309 (Put_WEP_on) a request to the MT concerning the use of the WEP algorithm for data ciphering. The MT acknowledges 310 (Put_WEP_on_ack) the request, so that the starting point of data ciphering is correctly timed. After this the second ciphering key K is applied in the MAC layer of the MT, and the MT enciphers the data to be sent and deciphers the received enciphered data 311 (Cipher data with K and WEP) using the K and the WEP algorithm. The AP also starts to use 312 (Cipher data with K and WEP) the K and the WEP algorithm for enciphering data directed to the MT and for deciphering data received from the MT. The AP checks the terminal MT MAC addresses of the received data and performs deciphering for data arriving from the MAC address and correspondingly enciphers the MT data directed to the MAC address. In this case, the K is rapidly initiated and data ciphering can be started.

Another alternative way to initiate the second ciphering key K after the message 308 (223) is to utilize other IEEE802.11 protocol messages. The MT may perform deauthentication for the open system authentication (301, 302) instead of the messages 309 and 310. After deauthentication the MT may request a shared key authentication of IEEE802.11 standard from the access point. Thereafter, the four frame (first, second, third, final) transmission known as such from IEEE802.11 standard is carried out in order to be able to observe that both parties comprise the same shared key. In such a case the shared key is the second ciphering key K. If the shared key is successfully authenticated, the process proceeds to ciphering 311, 312. The advantage achieved is that it is possible to use the messages of IEEE802.11 protocol.

If a handover is performed for the terminal to a new access point, the old access point may transmit the second ciphering key K to the new access point. Consequently, data ciphering can be offered also after handover.

Figure 4:
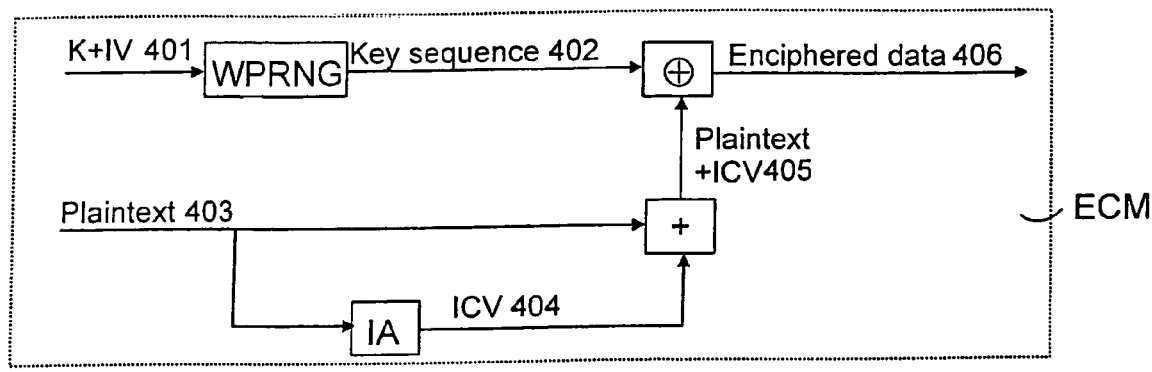
FIG. 4 illustrates ciphering means for enciphering data.

FIG. 4 illustrates in accordance with a preferred embodiment of the invention enciphering means ECM included in the access point AP and the terminal MT for enciphering data using the second ciphering key K and the WEP algorithm. Both the MT and the AP encipher the frames as shown in FIG. 4. The second ciphering key K is concacenated with a 24-bit initialization vector IV so as to form an input 401 for a WEP pseudorandom number generator WPRNG. The WPRNG provides a key sequence 402 which is as long as the number of data octets to be transferred +4. This is carried out because an integrity check value ICV 404 formed of a plain text 403 in an integrity algorithm IA is also protected. The plain text 403 is combined with the integrity check value ICV 404 and a result 405 (Plain text+ICV) is applied to be combined with the key sequence 402. The key sequence 402 is thereafter combined with the plain text and the ICV 405 using an XOR operation. Enciphered data 406 can then be applied to the radio path for transmission.

The initialization vector IV is also transmitted with the enciphered data 406 in a message to be sent. The value of the IV is preferably changed for each packet to be sent, as this complicates the operation of an eavesdropper. The use of the WEP algorithm for enciphering data extends a MPDU unit (MAC Protocol Data Unit) to be sent by 8 octets: 4 octets for the initialization vector IV and 4 octets for the integrity check value ICV.

Figure 5:
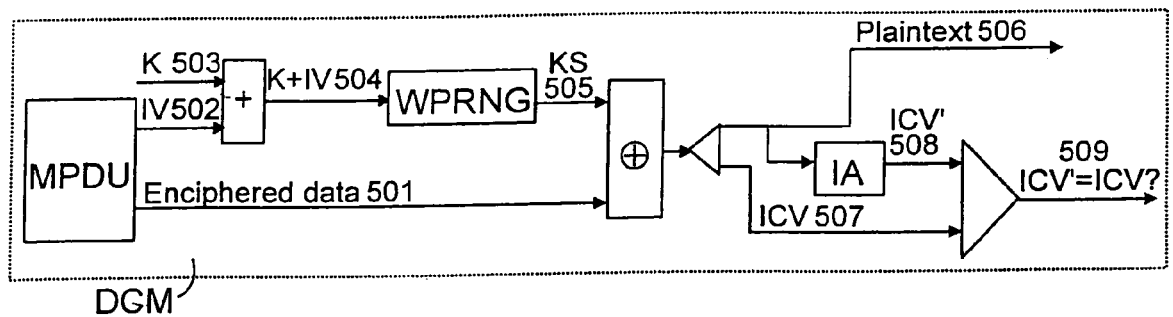
FIG. 5 illustrates ciphering means for deciphering data.

FIG. 5 shows deciphering means DCM included in the access point AP and the terminal MT for deciphering enciphered data using the second ciphering key K and the WEP algorithm. When the AP or the MT receives an enciphered message MPDU sent over the radio path, the operations described in FIG. 4 are carried out in reverse. A combination 504 (K+IV) of an initialization vector IV 502 and a secret key K 503 of the received message MPDU is fed into the WEP pseudorandom number generator WPRNG, and a key sequence KS 505 is obtained. An XOR operation is performed for the key sequence KS 505 and the enciphered data 501. An original plain text 506 and an integrity check value ICV 507 are obtained therefrom. An integrity check can be carried out for the plain text 506 using an algorithm IA. An obtained check value ICV' 508 can be compared 509 (ICV'=ICV?) with the ICV. If they are not identical, then the received MAC protocol unit is erroneous.

The invention can also be applied in a telecommunication system supporting a mobile IP. The telecommunication system supporting the mobile IP comprises mobility agents supporting the IP mobility, i.e. home agents HA and foreign agents FA. The home agents tunnel the packets directed to the terminal in the visiting network of the terminal to register with the foreign agent, which forwards the packets to the terminal.

In accordance with a preferred embodiment the visiting wireless local area network of the terminal MT may employ one or more mobility agents. The MT communicates with the mobility agent, which in turn communicates with the GAGW. The same operations can then be performed as illustrated in FIG. 2, except that the PAC is compensated with a mobility agent (HA or FA). Data transmission between the MT and the mobility agent is carried out with an mobile IP message comprising an extension. The MT may request (204) for authentication using a registration request message comprising a network identifier NAI. The GAGW can operate as shown in FIG. 2. The mobility agent preferably responds to the authentication request by replying (211) with a registration reply comprising the challenge codes (RAND). The terminal MT can in turn send a new registration request message comprising a check response SIGNsres to the mobility agent. Later on the MT can be informed about a successful authentication with a reply message. If the authentication is successful the calculated second ciphering key K can be implemented in the terminal MT and in the access point AP.

The functionality of the invention described above can be implemented in processors comprising the terminal MT and the network elements (AP, PAC, RAGW) preferably by software. It is also possible to use hardware solutions, such as ASIC circuits (Application Specific Integrated Circuit) or separate logic.

It is obvious for those skilled in art that as technology progresses the basic idea of the invention can be implemented in various ways. The invention and its preferred embodiments are therefore not restricted to the examples above but may vary within the scope of the claims.

The invention claimed is:

1. A method for arranging data ciphering in a telecommunication system having one wireless terminal, a wireless local area network and a public land mobile network, the method comprising:
    offering an identifier for the at least one wireless terminal and a specific secret key for the identifier, the secret key also being stored in the mobile network,
    arranging data transmission between the mobile network and the at least one wireless terminal through the wireless local area network,
    sending the terminal identifier from the at least one wireless terminal to the mobile network via the wireless local area network,
    calculating in the mobile network at least one first ciphering key using the secret key specific for the identifier and a challenge code selected for the first ciphering key,
    sending at least one challenge code to the at least one wireless via the wireless local area network,
    calculating in the at least one wireless terminal at least one first ciphering key using the secret key and at least one challenge code,
    calculating a second ciphering key in the at least one terminal and in the mobile network using said at least one first ciphering key,
    sending said second ciphering key from the mobile network to the wireless local area network, and
    ciphering the data between the at least one wireless terminal and mobile network in the at least one wireless terminal and in the wireless local area network using said second ciphering key,
    wherein the terminal comprises a subscriber identity module SIM of the GSM system, the wireless local area network supports IEEE802.11 standard, and the mobile network supports GSM standard.

2. A telecommunication system comprising at least one wireless terminal, and a public land mobile network, wherein:
    the mobile network is configured to calculate at least one ciphering key using a secret key according to an identifier sent by the at least one wireless terminal via a wireless local area network and a challenge code selected for the first ciphering key,
    the mobile network is configured to send at least one challenge code for the at least one wireless terminal via the wireless local area network,
    the mobile network is configured to calculate a second ciphering key using said at least one first ciphering key and a device for sending said second ciphering key to the wireless local area network,
    the at least one wireless terminal an identity module for calculating at least one first ciphering key using the secret key stored in the identity module and at least one challenge code,
    the at least one wireless terminal is configured to calculate a second ciphering key using said at least one first ciphering key,
    the wireless local area network is configured to decipher the data between the at least one wireless terminal and the wireless local area network using said second ciphering key,
    wherein the wireless local area network and the terminal support IEEE802.11 standard, and the mobile network supports GSM standard, and the wireless local area network and the terminal are configured to cipher data using a WEP algorithm.

3. A wireless terminal comprising:
    a transceiver for establishing a wireless connection with an access point in a wireless local area network, and
    an identity module for calculating at least one first ciphering key using a secret key stored in the identity module and at least one challenge code sent by a mobile network and transferred via the wireless local area network,
    wherein the wireless terminal is configured to calculate a second ciphering key using said at least one first ciphering key,
    the wireless terminal is configured to decipher the data between the terminal and the access point using said second ciphering key, and wherein the terminal comprises a subscriber identity module SIM and the GSM system, the wireless local area network supports IEEE 802.11 standards, and the mobile network supports the GSM standard.

4. A wireless terminal of claim 3, wherein the identity module of the terminal is configured to calculate at least one authentication response on the basis of a challenge code and the secret key, the terminal is configured to calculate a check response on the basis of at least one authentication response and said at least one first ciphering key, and the wireless terminal is configured to send the check response to the mobile network.

5. A wireless terminal of claim 3, wherein the terminal supports IEEE802.11 standard and the terminal is configured to encipher data using a WEP algorithm.

6. An access point of a wireless local area network comprising:

a ciphering device for enciphering/deciphering data between at one wireless terminal and the access point, wherein the ciphering device is configured to encipher the data to be sent and to decipher the received data using a terminal-specific second ciphering key calculated by a public land mobile network, wherein the second ciphering key is calculated using at least one first ciphering key calculated in the mobile network using a secret key specific for the terminal and a challenge code selected for the first ciphering key, and wherein the terminal comprises a subscriber identity module SIM of the GSM system, the wireless local area network supports IEEE802.11 standard, and the mobile network supports GSM standard.

7. An access point of claim 6, wherein the access point supports IEEE802.11 standard and the ciphering device is configured to encipher the data to be sent and to decipher the received data using a WEP algorithm.

* * * * *